(12) United States Patent
Boussand

(10) Patent No.: US 9,315,706 B2
(45) Date of Patent: Apr. 19, 2016

(54) 3,3,3-TRIFLUOROPROPENE COMPOSITIONS

(75) Inventor: Beatrice Boussand, Sainte Foy les Lyon (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 13/824,495

(22) PCT Filed: Aug. 4, 2011

(86) PCT No.: PCT/FR2011/051870
§ 371 (c)(1),
(2), (4) Date: Jul. 31, 2013

(87) PCT Pub. No.: WO2012/038630
PCT Pub. Date: Mar. 29, 2012

(65) Prior Publication Data
US 2013/0299733 A1    Nov. 14, 2013

(30) Foreign Application Priority Data
Sep. 20, 2010   (FR) ..................................... 10 57484

(51) Int. Cl.
*C09K 5/04*      (2006.01)
*C10M 171/00*    (2006.01)

(52) U.S. Cl.
CPC ............ *C09K 5/045* (2013.01); *C10M 171/008* (2013.01); *C09K 2205/126* (2013.01); *C09K 2205/24* (2013.01); *C10M 2207/283* (2013.01); *C10M 2207/2835* (2013.01); *C10M 2209/04* (2013.01); *C10M 2209/043* (2013.01); *C10N 2220/30* (2013.01); *C10N 2220/302* (2013.01); *C10N 2240/30* (2013.01)

(58) Field of Classification Search
CPC ............ C09K 5/045; C09K 2205/126; C10M 171/008; C10M 2207/283; C10M 2207/2835; C10M 2209/04; C10M 2209/043
USPC .......................................................... 252/68
See application file for complete search history.

(56) References Cited

U.S. PATENT DOCUMENTS

| | | | |
|---|---|---|---|
| 5,076,064 A | 12/1991 | Kopko | |
| 5,363,674 A | 11/1994 | Powell | |
| 6,248,255 B1 | 6/2001 | Pearson | |
| 6,991,743 B2 | 1/2006 | Poole et al. | |
| 8,070,977 B2 | 12/2011 | Rached | |
| 8,075,798 B2 | 12/2011 | Rached | |
| 8,951,432 B2 | 2/2015 | Boutier et al. | |
| 9,005,468 B2 | 4/2015 | Rached | |
| 2004/0089839 A1 | 5/2004 | Thomas et al. | |
| 2006/0243944 A1 | 11/2006 | Minor et al. | |
| 2007/0069175 A1 | 3/2007 | Thomas et al. | |
| 2008/0111099 A1* | 5/2008 | Singh et al. ...................... 252/67 |
| 2008/0184731 A1 | 8/2008 | Sienel et al. | |
| 2008/0314073 A1 | 12/2008 | Minor | |
| 2009/0120619 A1 | 5/2009 | Sievert et al. | |
| 2009/0158771 A1 | 6/2009 | Low et al. | |
| 2009/0241562 A1 | 10/2009 | Thomas et al. | |
| 2009/0314015 A1 | 12/2009 | Minor | |
| 2010/0044619 A1 | 2/2010 | Hulse et al. | |
| 2010/0108936 A1 | 5/2010 | Kaneko et al. | |
| 2010/0133463 A1* | 6/2010 | Kaneko et al. .................. 252/68 |
| 2010/0186432 A1 | 7/2010 | Perti et al. | |
| 2010/0319377 A1 | 12/2010 | Moriwaki et al. | |
| 2010/0326129 A1 | 12/2010 | Moriwaki et al. | |
| 2011/0011124 A1 | 1/2011 | Matsuura et al. | |
| 2011/0258147 A1 | 10/2011 | Low | |
| 2012/0068104 A1 | 3/2012 | Rached et al. | |
| 2012/0068105 A1 | 3/2012 | Rached et al. | |
| 2012/0097885 A9 | 4/2012 | Hulse et al. | |
| 2012/0126187 A1 | 5/2012 | Low | |
| 2012/0292556 A1 | 11/2012 | Van Horn | |
| 2013/0055733 A1 | 3/2013 | Rached | |
| 2013/0055739 A1 | 3/2013 | Rached | |
| 2013/0061613 A1 | 3/2013 | Rached | |
| 2014/0110623 A1 | 4/2014 | Boutier et al. | |
| 2015/0184051 A1 | 7/2015 | Rached | |

FOREIGN PATENT DOCUMENTS

| | | |
|---|---|---|
| EP | 2 149 592 A2 | 2/2010 |
| JP | H04-110388 | 4/1992 |
| WO | WO 97/17414 A1 | 5/1997 |
| WO | WO 2004/037913 A2 | 5/2004 |
| WO | WO 2005/108522 A1 | 11/2005 |
| WO | WO 2007/002625 A2 | 1/2007 |
| WO | WO 2007/002625 A3 | 1/2007 |
| WO | WO 2007/053697 A2 | 5/2007 |
| WO | WO 2007/053697 A3 | 5/2007 |
| WO | WO 2007/126414 A2 | 11/2007 |
| WO | WO 2007/126414 A3 | 11/2007 |
| WO | WO 2008/053951 A1 | 5/2008 |
| WO | WO 2008/130026 A1 | 10/2008 |

(Continued)

OTHER PUBLICATIONS

U.S. Appl. No. 14/773,961, Bonnet, et al.
U.S. Appl. No. 14/880,605, Boussand.
International Search Report (English translation) issued in International Patent Application No. PCT/FR2011/051870, Jan. 23, 2012, 3 pages, European Patent Office, Rijswijk, NL.
Kontomaris, Kostas, et al., "Low GWP Refrigerants for Centrifugal Chillers," Ashrae Annual Conference, Jun. 20-24, 2009, 23 pages, Louisville, KY, DuPont Fluoroproducts, XP002604604.
Taira, Shigeharu, et al., "Examination regarding Air conditioning and Heat Pump Water System Using Post New Alternative Refrigerant," International Symposium on Next-Generation Air Conditioning and Refrigeration Technology, Feb. 17, 2010, 8 pages, Tokyo, JP, XP002604605.

(Continued)

*Primary Examiner* — John Hardee
(74) *Attorney, Agent, or Firm* — Buchanan Ingersoll & Rooney P.C.

(57) ABSTRACT

The invention relates to a composition including a polyol ester (POE) or PVE lubricant and a refrigerant F including 3,3,3-trifluoropropene. The invention also relates to the use of said composition for refrigeration, air-conditioning, and for heat pump.

14 Claims, No Drawings

(56) References Cited

FOREIGN PATENT DOCUMENTS

| | | |
|---|---|---|
| WO | WO 2009/018117 A1 | 2/2009 |
| WO | WO 2009/047535 A2 | 4/2009 |
| WO | WO 2009/047535 A3 | 4/2009 |
| WO | WO 2009/107364 A1 | 9/2009 |
| WO | WO 2009/110228 A1 | 9/2009 |
| WO | WO 2009/114398 A1 | 9/2009 |
| WO | WO 2009/116282 A1 | 9/2009 |
| WO | WO 2009/150763 A1 | 12/2009 |
| WO | WO 2009/151669 A1 | 12/2009 |
| WO | WO 2010/000993 A2 | 1/2010 |
| WO | WO 2010/000993 A3 | 1/2010 |
| WO | WO 2010/000994 A2 | 1/2010 |
| WO | WO 2010/000994 A3 | 1/2010 |
| WO | WO 2010/059677 A2 | 5/2010 |
| WO | WO 2010/059677 A3 | 5/2010 |
| WO | WO 2010/064005 A1 | 6/2010 |
| WO | WO 2010/119265 A1 | 10/2010 |
| WO | WO 2011/023923 A1 | 3/2011 |
| WO | WO 2011/082003 A1 | 7/2011 |
| WO | WO 2011/101608 A1 | 8/2011 |
| WO | WO 2011/101621 A2 | 8/2011 |
| WO | WO 2011/101621 A3 | 8/2011 |

OTHER PUBLICATIONS

Brasz, J.J., "Variable-speed centrifugal compressor behavior with low GWP refrigerants," International Conference on Compressors and Their Systems, Sep. 7, 2009, pp. 247-256, London, UK, XP008127860.

Bonnet, Phillippe, et al., U.S. Appl. No. 14/773,961 entitled "Composition Comprising HF and 1,3,3,3-Tetrafluoropropene," filed in the U.S. Patent and Trademark Office Sep. 9, 2015.

Boussard, Béatrice, U.S. Appl. No. 14/880,605 entitled "3,3,3-Trifluoropropene Composition," filed in the U.S. Patent and Trademark Office Oct. 12, 2015.

* cited by examiner

3,3,3-TRIFLUOROPROPENE COMPOSITIONS

This application claims priority to and is the national phase under 35 USC §371 of prior PCT International Application Number PCT/FR2011/051870 filed Aug. 4, 2011 which designated the United States of America and claimed priority to French Patent Application serial number 1057484 Filed Sep. 20, 2010.

FIELD OF THE INVENTION

The present invention relates to a composition containing 3,3,3-trifluoropropene and at least one lubricant, which can be used in refrigeration, air conditioning and heat pumps.

BACKGROUND OF THE INVENTION

The problems posed by substances which deplete the atmospheric ozone layer were addressed in Montreal, where the protocol imposing a reduction in the production and use of chlorofluorocarbons (CFCs) was signed. This protocol has been the subject of amendments which have required the abandoning of CFCs and have extended regulation to other products, including hydrochlorofluorocarbons (HCFCs).

The refrigeration and air conditioning industries have invested a great deal in the replacement of these refrigerants and it is because of this that hydrofluorocarbons (HFCs) have been marketed.

In the motor vehicle industry, the air conditioning systems of vehicles sold in many countries have been changed from a refrigerant comprising chlorofluorocarbon (CFC-12) to that of hydrofluorocarbon (1,1,1,2-tetrafluoroethane: HFC-134a), which is less harmful to the ozone layer. However, from the viewpoint of the objectives set by the Kyoto protocol, HFC-134a (GWP=1430) is regarded as having a high heating power. The contribution to the greenhouse effect of a refrigerant is quantified by a criterion, the GWP (Global Warming Potential), which summarizes the heating power by taking a reference value of 1 for carbon dioxide.

Hydrofluoroolefins (HFOs) have a low heating power and therefore meet the objectives set by the Kyoto protocol. Document JP 4-110388 discloses hydrofluoropropenes as heat transfer agents.

In the industrial sector, the refrigerating machines most commonly used are based on cooling by evaporation of a liquid refrigerant. After vaporization, the refrigerant is compressed and then cooled in order to return to the liquid state and thus continue the cycle.

The refrigerant compressors used are of reciprocating, centrifugal, scroll or screw type. In general, internal lubrication of compressors is essential in order to reduce wear and heating of the moving parts, to render them completely leak-tight and to protect them from corrosion.

In addition to having good properties as a heat transfer agent, in order for a refrigerant to be accepted commercially, it must in particular be thermally stable and be compatible with lubricants. This is because it is highly desirable for the refrigerant to be compatible with the lubricant used in the compressor, present in the majority of refrigeration systems. This refrigerant and lubricant combination is important for the use and the effectiveness of the refrigeration system; in particular, the lubricant must be sufficiently soluble or miscible in the refrigerant throughout the operating temperature range.

Thus, polyalkylene glycols (PAGs) have been developed as lubricants of HFC-134a in motor vehicle air conditioning.

Tests for compatibility of 1,1,3,3,3-pentafluoropropene, of 1,3,3,3-tetrafluoropropene and of 3,3,3-trifluoropropene with PAGs have been described in example 3 of document WO 2004/037913. This document is content with giving only the visual appearance of the samples after the tests.

DETAILED DESCRIPTION OF THE INVENTION

The applicant has now developed a refrigerant and lubricant pairing which can be used in refrigeration, air conditioning and heat pumps. This pairing has the advantage of being particularly stable for the lubricant and/or the refrigerant.

A subject of the present application is therefore a composition comprising at least one lubricant based on polyol esters (POEs) or on polyvinyl ether (PVE) and a refrigerant F comprising 3,3,3-trifluoropropene (HFO-1243zf).

According to the present invention, the refrigerant F can comprise, in addition to the HFO-1243zf, other hydrofluoropropenes, for instance 2,3,3,3-tetrafluoropropene (HFO-1234yf) and trans-1,3,3,3-tetrafluoropropene.

The refrigerant F can also comprise hydrofluorocarbons such as 1,1,1,2-tetrafluoroethane, 1,1-difluoromethane and pentafluoroethane.

Compared with the other hydrofluoropropenes, 3,3,3-trifluoropropene has the advantage of already being a commercial product.

Polyol esters are obtained by reaction of a polyol (an alcohol containing at least 2 hydroxyl groups —OH) with a monofunctional or plurifunctional carboxylic acid or with a mixture of monofunctional carboxylic acids. The water formed during this reaction is eliminated in order to prevent the reverse reaction (i.e. hydrolysis).

According to the present invention, the preferred polyols are those which have a neopentyl backbone, such as neopentyl glycol, trimethylol propane, pentaerythritol and dipentaerythritol; pentaerythritol is the preferred polyol.

The carboxylic acids may comprise from 2 to 15 carbon atoms, it being possible for the carbon backbone to be linear or branched. Mention may particularly be made of n-pentanoic acid, n-hexanoic acid, n-heptanoic acid, n-octanoic acid, 2-ethylhexanoic acid, 2,2-dimethylpentanoic acid, 3,5,5-trimethylhexanoic acid, adipic acid and succinic acid, and mixtures thereof.

Some alcohol functions are not esterified, but their proportion remains low. Thus, the POEs can comprise between 0 and 5 relative mol % of $CH_2$—OH units relative to the —$CH_2$—O—(C=O)-units.

The preferred POE lubricants are those which have a viscosity of from 1 to 1000 centiStokes (cSt) at 40° C., preferably from 10 to 200 cSt, and advantageously from 30 to 80 cSt.

The polyvinyl ether (PVE) oils are preferably copolymers of the following 2 units:

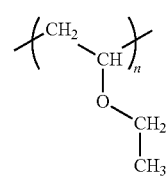

Unit 1

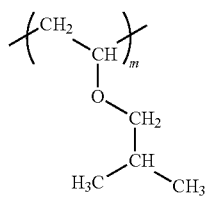

Unit 2

The properties of the oil (viscosity, solubility of the refrigerant and miscibility with the refrigerant in particular) can be adjusted by varying the m/n ratio and the sum m+n. The preferred PVE oils are those having 50% to 95% by weight of unit 1.

According to one preferred embodiment of the invention, the lubricant(s) represent(s) between 10% and 50%, inclusive, by weight of the composition. POE is particularly preferred.

The refrigerant F can also comprise additives such as odorous compounds.

A subject of the present invention is also the use of the abovementioned composition in refrigeration, in particular domestic refrigeration, commercial refrigeration, cold rooms, the food industry, the processing industry, refrigerated transport (trucks, ships); air conditioning, in particular domestic, commercial or industrial air conditioning, where the equipment used is either chillers or direct expansion equipment; and heat pumps, in particular medium-temperature and high-temperature heat pumps.

EXPERIMENTAL SECTION

The thermal stability tests are carried out according to standard ASHRAE 97-2007: "sealed glass tube method to test the chemical stability of materials for use within refrigerant systems".

The test conditions are the following:
weight of refrigerant F: 22 g
weight of lubricant: 5 g
temperature: 200° C.
duration: 14 days The lubricant is introduced into a 42.2 ml glass tube. A vacuum is subsequently pulled in the tube and then the refrigerant F is added thereto. The tube is then welded shut and placed in an oven at 200° C. for 14 days.

At the end of the test, various analyses are carried out:
the gas phase is recovered in order to be analyzed by gas chromatography: the main impurities are identified by GC/MS (coupled gas chromatography/mass spectrometry). The impurities coming from the refrigerant F and those coming from the lubricant can thus be grouped together;
the lubricant is analyzed: color (by spectrocolorimetry, Labomat DR Lange LICO220 model MLG131), water content (by Karl Fischer coulometry, Mettler DL37) and acid number (by quantitative determination with 0.01N methanolic potassium hydroxide).

3 commercial lubricants were tested: the oil PAG ND8, the oil POE Ze-GLES RB68 and PVE FVC 68D.

The refrigerant F essentially contains HFO-1243zf.

|  | PAG ND8 | POE Ze-GLES B68 | PVE FVC 68D |
|---|---|---|---|
| gerant By-products in the gas phase: | HFO-1243zf | HFO-1243zf | HFO-1243zf |
| from the refrigerant | 1300 ppm | 500 ppm | 0.7% |
| from the lubricant | 2% | 1100 ppm | 5% |
| Analysis of the lubricant: |  |  |  |
| color | 6.5 Gardner | 100 Hazen | 6.2 Gardner |
| water content | 1000 ppm | 400 ppm | 350 ppm |
| acid number | 3.7 mg KOH/g | 0.3 mg KOH/g | 0.5 mg KOH/g |

It is noted that the acid number is lower in the presence of the POE or PVE. In addition, in the presence of the POE, the stability of the refrigerant is also improved.

The invention claimed is:

1. A composition consisting of:
at least one lubricant based on
at least one polyol ester obtained from a polylol having a neopentyl backbone, or
at least one polyvinyl ether;
a refrigerant consisting of 3,3,3-trifluoropropene, 2,3,3,3-tetrafluoropropene, and trans-1,3,3,3-tetrafluoropropene; and
optionally at least one of a compatibilizer, a surfactant, and a solubilizing agent.

2. The composition as claimed in claim 1, wherein the lubricant is based on the at least one polyol ester obtained from a polyol having a neopentyl backbone.

3. The composition as claimed in claim 1, wherein the lubricant is based on the at least one polyol ester, and wherein the at least one polyol ester is obtained from linear or branched carboxylic acid having from 2 to 15 carbon atoms.

4. The composition as claimed in claim 1, wherein the lubricant is based on the at least one polyol ester, and wherein the at least one polyol ester represents between 10% and 50% by weight of the composition.

5. The composition as claimed in claim 1, wherein the polyol having the neopentyl backbone is selected from the group neopentyl glycol, trimethylol propane, and dipentaerythritol.

6. The composition as claimed in claim 1, wherein the lubricant is based on the at least one polyol ester, and wherein the at least one polyol ester is a pentaerythritol ester.

7. The composition as claimed in claim 1, wherein the lubricant is based on the at least one polyol ester, and wherein the at least one polyol ester comprise between 0 and 5 relative mol % of $CH_2$—OH units relative to the —$CH_2$—O—(C=O)-units.

8. The composition as claimed in claim 1, wherein the lubricant has a viscosity of from 1 to 1000 centiStokes at 40° C.

9. The composition as claimed in claim 1, wherein the lubricant has a viscosity of from 30 to 80 centiStokes at 40° C.

10. The composition as claimed in claim 1, wherein the lubricant is based on the at least one polyvinyl ether, and wherein the at least one polyvinyl ether is a copolymer of the following 2 units:

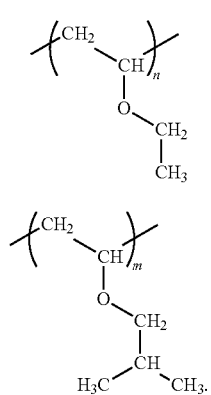

11. The composition as claimed in claim 1, wherein the lubricant is based on the at least one polyvinyl ether.

12. A composition consisting of at least one lubricant comprising at least one polyvinyl ether and a refrigerant consisting of 3,3,3-trifluoropropene, wherein the at least one polyvinyl ether is a copolymer of the following 2 units:

13. The composition as claimed in claim 12, wherein the at least one polyvinyl ether represents between 10% and 50% by weight of the composition.

14. The composition as claimed in claim 12, wherein the at least one polyvinyl ether has 50% to 95% by weight of unit 1.

* * * * *